United States Patent [19]

Miyajima

[11] Patent Number: 5,218,583
[45] Date of Patent: Jun. 8, 1993

[54] APPARATUS FOR SUCCESSIVELY TREATING OPTICAL CARDS

[75] Inventor: Hiroshi Miyajima, Hachioji, Japan

[73] Assignee: Olympus Optical Co., Ltd., Tokyo, Japan

[21] Appl. No.: 682,072

[22] Filed: Apr. 9, 1991

[30] Foreign Application Priority Data

Apr. 11, 1990 [JP] Japan ................................. 2-94104
May 30, 1990 [JP] Japan ................................ 2-138513

[51] Int. Cl.$^5$ ....................... G11B 17/10; G11B 17/04
[52] U.S. Cl. ........................................ 369/36; 369/38;
360/92; 360/98.01; 360/98.04; 360/98.06;
221/87; 221/88
[58] Field of Search .................. 369/30, 39, 36, 37,
369/38; 235/487; 360/98.04, 98.06, 98.01, 92;
221/87, 88

[56] References Cited

U.S. PATENT DOCUMENTS

| | | | |
|---|---|---|---|
| 4,787,074 | 11/1988 | Deck et al. | 369/36 |
| 4,855,980 | 8/1989 | Hug et al. | 369/39 |
| 4,924,199 | 5/1990 | Hashimoto et al. | 235/487 |
| 4,991,041 | 2/1991 | Grant | 360/92 |
| 4,993,010 | 2/1991 | Kishimura et al. | 369/36 |
| 5,045,958 | 9/1991 | Leonard et al. | 369/38 |
| 5,050,020 | 9/1991 | Campbell et al. | 360/92 |
| 5,050,023 | 9/1991 | Ashby | 360/98.06 |

Primary Examiner—Dale M. Shaw
Assistant Examiner—Diane E. Smith
Attorney, Agent, or Firm—Stevens, Davis, Miller & Mosher

[57] ABSTRACT

An apparatus for continuously processing a plurality of optical cards in succession including a magazine having a plurality of racks on which a plurality of optical cards are placed, a table on which the magazine is detachably set, and a main body which supports the magazine movably up and down. On a side wall of the table is secured a rack extending vertically and a pinion is engaged with the rack. By driving the pinion, the table and thus the magazine is moved up and down so that a desired optical card can be indexed at a card discharging position. A driving roller is selectively caused to contact a side edge of the desired optical card through a window, and the optical card can be discharged from the magazine by rotating the driving roller. There is further provided a driving mechanism for feeding the optical card discharged from the magazine into an optical card utilizing device. After the optical card has been processed in the utilizing device, the optical card can be inserted into the magazine. Since the driving mechanisms for discharging and inserting the optical card out of and into the magazine are provided outside the magazine, the overall apparatus can be simplified and reduced in size.

18 Claims, 10 Drawing Sheets

FIG_1

FIG_2

FIG_3

FIG_5A

FIG_5B

FIG_6

FIG_7

FIG_8

FIG. 9

FIG_10

APPARATUS FOR SUCCESSIVELY TREATING OPTICAL CARDS

BACKGROUND OF THE INVENTION

Field of the Invention and Related Art Statement

The present invention relates to an apparatus for successively treating optical cards comprising a magazine for storing a number of optical cards and a driving means for transporting the optical cards out of and into the magazine.

The above mentioned apparatus can be utilized to supplying the optical card into an apparatus such as an optical card reader and/or writer, an optical card testing device, an optical card sorting device and optical cards retrieving device, in which a number of optical cards are processed successively.

The optical card has a superior property that a very large amount of information can be recorded thereon and it can be manufactured at a low cost, so that it is convenient to manufacture a very large number of optical card having the same information recorded thereon in a fully automatic manner with the aid of a printing machine. On the other hand, it is also proposed to manufacture a relatively small number of optical cards having specific information recorded thereon. In the optical cards testing device. optical card sorting device and optical card retrieving device, it is desired to develop an optical card continuously treating apparatus which stores a plurality of optical cards in a magazine and the optical cards are successively supplied into a predetermined position of the utilizing device.

In Japanese Patent Publication No. 61-61437, there is disclosed an apparatus for reading the optical cards successively, comprising an optical card supplying section for successively supplying the optical cards into an optical card reading position and an optical card discharging section for discharging the optical cards successively out of the optical card reading position. In this known apparatus the optical cards are stored in a magazine in such manner that they are separated from each other, but a space for storing a single optical card is so large that the magazine is liable to become large. Moreover, as the magazine comprises a driving device for discharging the optical card out of the magazine, the magazine is complicated in construction and large in size. If it is required to issue a large number of optical cards, a large number of magazines must be prepared, so that the cost becomes high.

In Japanese Patent Application Laid-open Publication Kokai Sho No. 48-30340, there is described another known optical card reader in which optical cards are stored in a cartridge and are discharged therefrom one by one through an opening provided at the bottom of the cartridge. The optical card discharged from the cartridge is then fed into the optical card reading position by means of a conveying belt. In this known optical card reader, in order to discharge the optical cards one by one out of the cartridge, the opening provided at the bottom of the cartridge is formed in the shape of a thin slit and the optical cards are pressed downwards by means of a resilient member. Therefore, successively stacked optical cards are pressed against each other and the surfaces of optical cards might be injured. In the optical cards in which the recorded information is read out by utilizing difference in the reflectivity of the card surface, defects on the card surfaces might result in erroneous reading.

SUMMARY OF THE INVENTION

The present invention has for its object to provide a novel and useful apparatus for continuously treating successive optical cards, while the card surfaces can be effectively protected against injury.

It is another object of the invention to provide an optical card continuously treating apparatus which is simple in construction and cheap in cost.

According to the invention, an apparatus for continuously treating optical cards in succession comprises:

a magazine for storing a plurality of optical cards such that the optical cards are separated from each other;

a table for supporting said magazine movably in a first direction in which said optical cards are stacked;

a magazine driving means provided outside said magazine for moving the magazine in said first direction such that a desired optical card stored in the magazine is indexed at a predetermined optical card discharging and inserting position;

a first optical card driving means provided outside said magazine for discharging and inserting an optical card positioned at said predetermined optical card discharging and inserting position out of and into the magazine; and a second optical card driving means provided outside said magazine for feeding the optical card discharged from the magazine by said first optical card driving means into an optical card utilizing device and feeding the optical card from said optical card utilizing device toward said magazine.

In a preferred embodiment of the apparatus according to the invention, said magazine comprises a main body, a plurality of racks arranged within said main body for supporting the optical cards horizontally, and at least one window formed in said main body, through said window side edges of the optical cards being exposed out of the main body, said magazine driving means is constructed to move the magazine up and down, and said first optical card driving means comprises a driving roller which is selectively brought into contact with a side edge of the optical card indexed at the predetermined optical card discharging and inserting position and driving means for rotating said driving roller in both directions.

In the optical card continuously treating apparatus according to the invention, the first and second optical card driving means are all provided outside the magazine, so that the whole construction of the apparatus can be made simple and small. In another preferable embodiment of the apparatus according to the invention, said first and second driving means are actuated by a single common driving motor, so that the construction can be made much simpler and smaller.

In still another preferable embodiment of the apparatus according to the invention, the magazine comprises a means for selectively clamping the optical cards in the magazine. In such an embodiment, when the magazine is removed from the apparatus, the optical cards are clamped in position, and thus the optical cards can be prevented from being shifted given position or removed out of the magazine.

DETAILED EXPLANATION OF THE PREFERRED EMBODIMENTS

Figure 1:
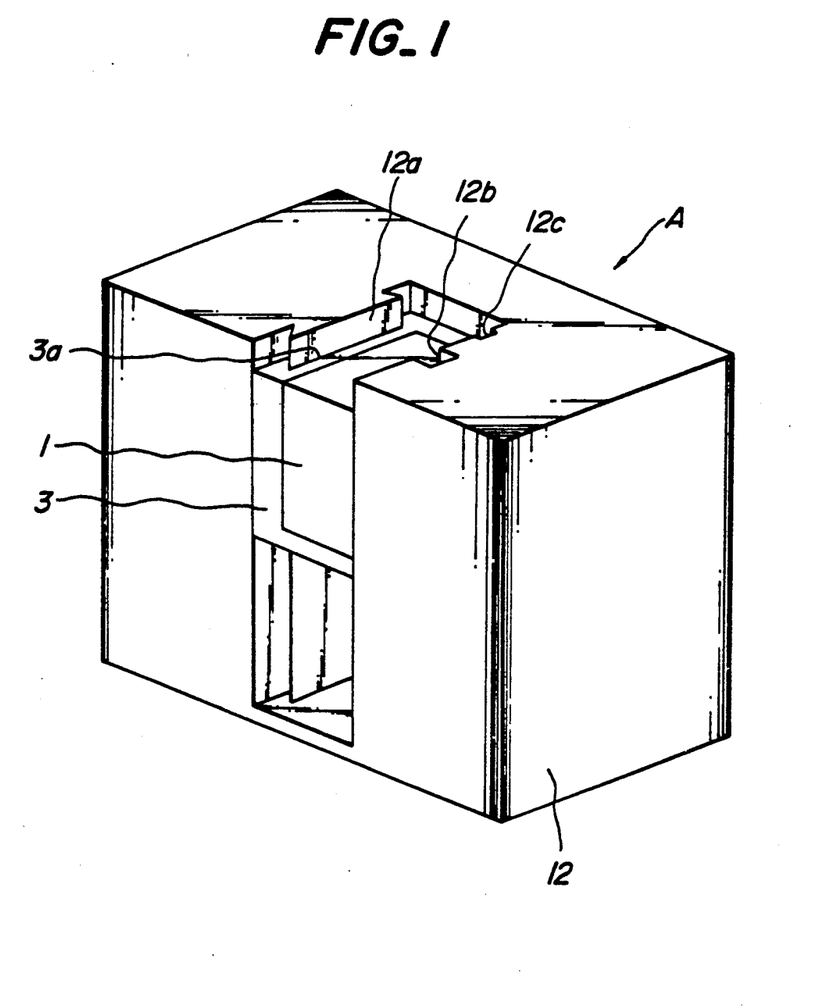
FIG. 1 is a perspective view showing an outer configuration of an embodiment of the optical card continuously treating apparatus according to the invention.
Figure 2:
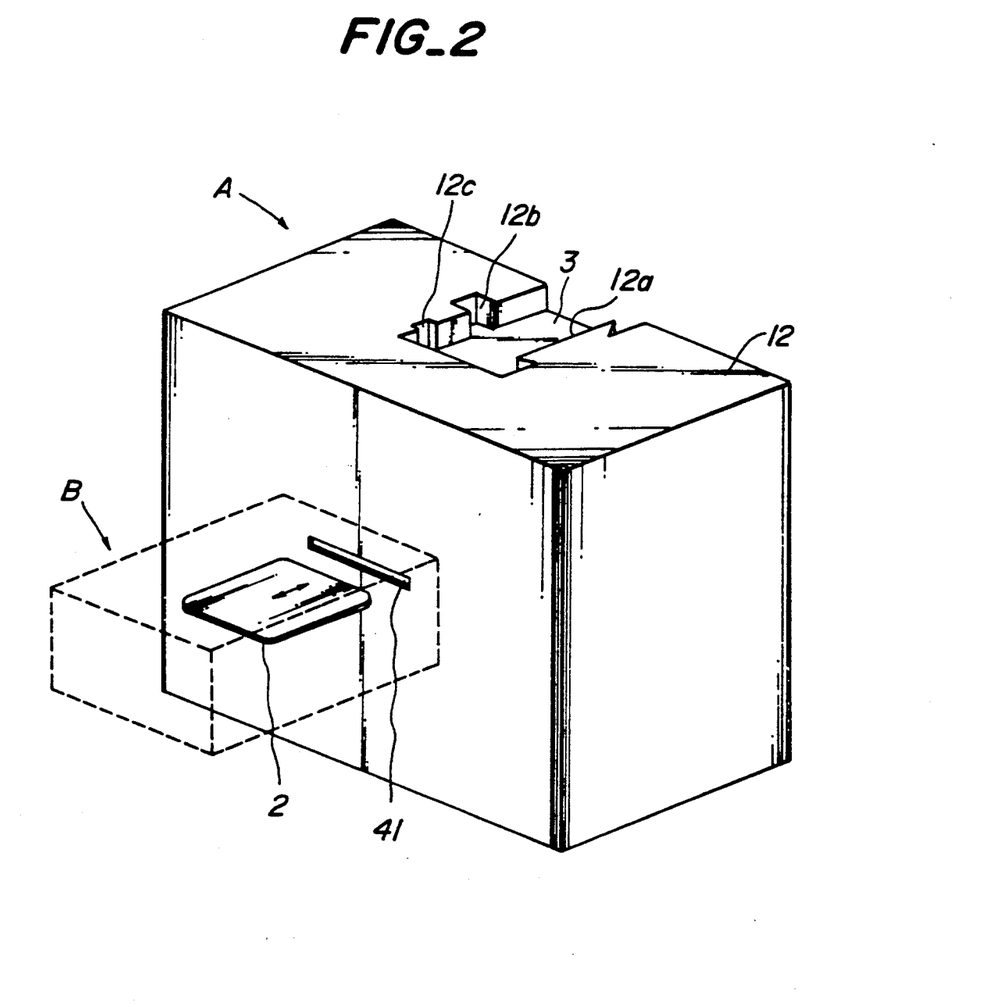
FIG. 2 is a perspective view illustrating the apparatus having the optical card utilizing apparatus coupled thereto.

FIG. 1 is a perspective view showing the whole construction of apparatus for continuously treating optical cards according to the invention, and FIG. 2 is a perspective view illustrating the optical card continuously treating apparatus A to which an optical card reader and/or writer B is detachably secured. The apparatus A comprises a magazine 1 in which a plurality of optical cards are stored, a table 3 for detachably supporting the magazine, and a main body 12 for supporting the table 3 having the magazine 1 movably in a first direction, i.e. in the up and down direction. To this end, the table 3 comprises a dovetail groove 3a and the main body 12 has a dovetail projection 12a which is slidably inserted into the dovetail groove 3a. In a side wall of the main body 12 there is formed a slit-like opening 41 through which an optical card 2 can be moved between the optical card treating apparatus A according to the invention and the optical card reader and/or writer B. It should be noted that the opening 41 has a height which is slightly larger than a thickness of the optical card 2 and a width which is wider than a width of the optical card, so that the optical card is not brought into contact with the opening 41 and is not injured during a passage through the opening. The main body 12 further comprises grooves 12b and 12c which extend in parallel with the dovetail projection 12a. The function of these grooves 12b and 12c will be apparent later.

Figure 3:
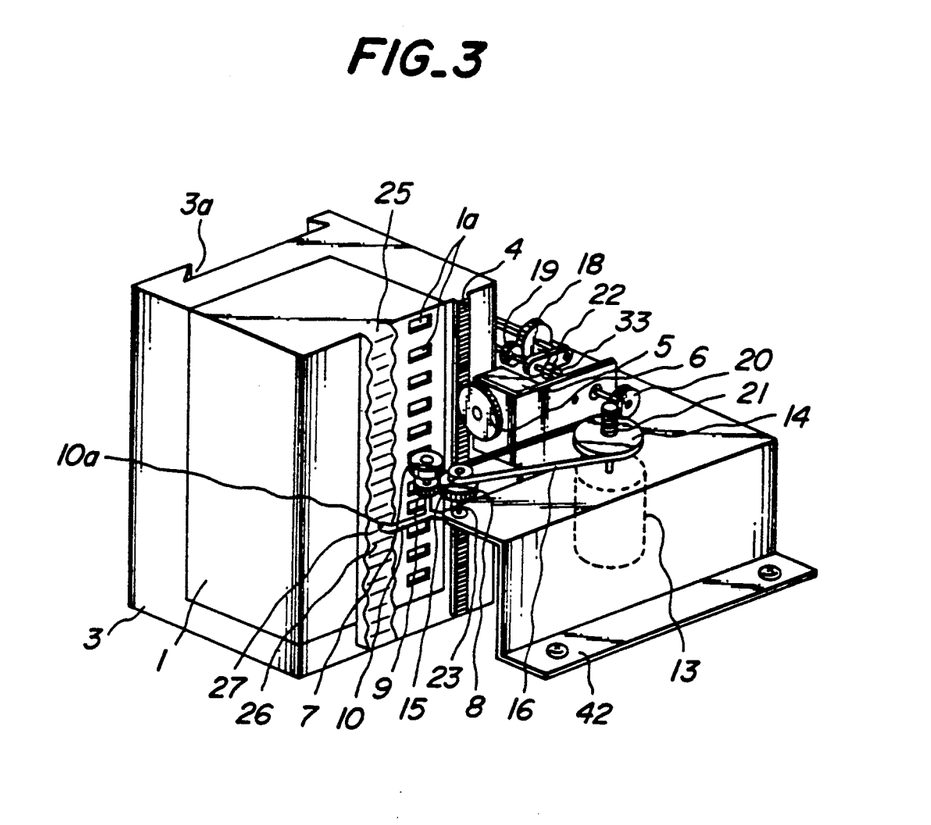
FIG. 3 is a perspective view depicting the detailed construction of the first optical card driving mechanism of the apparatus.
Figure 4:
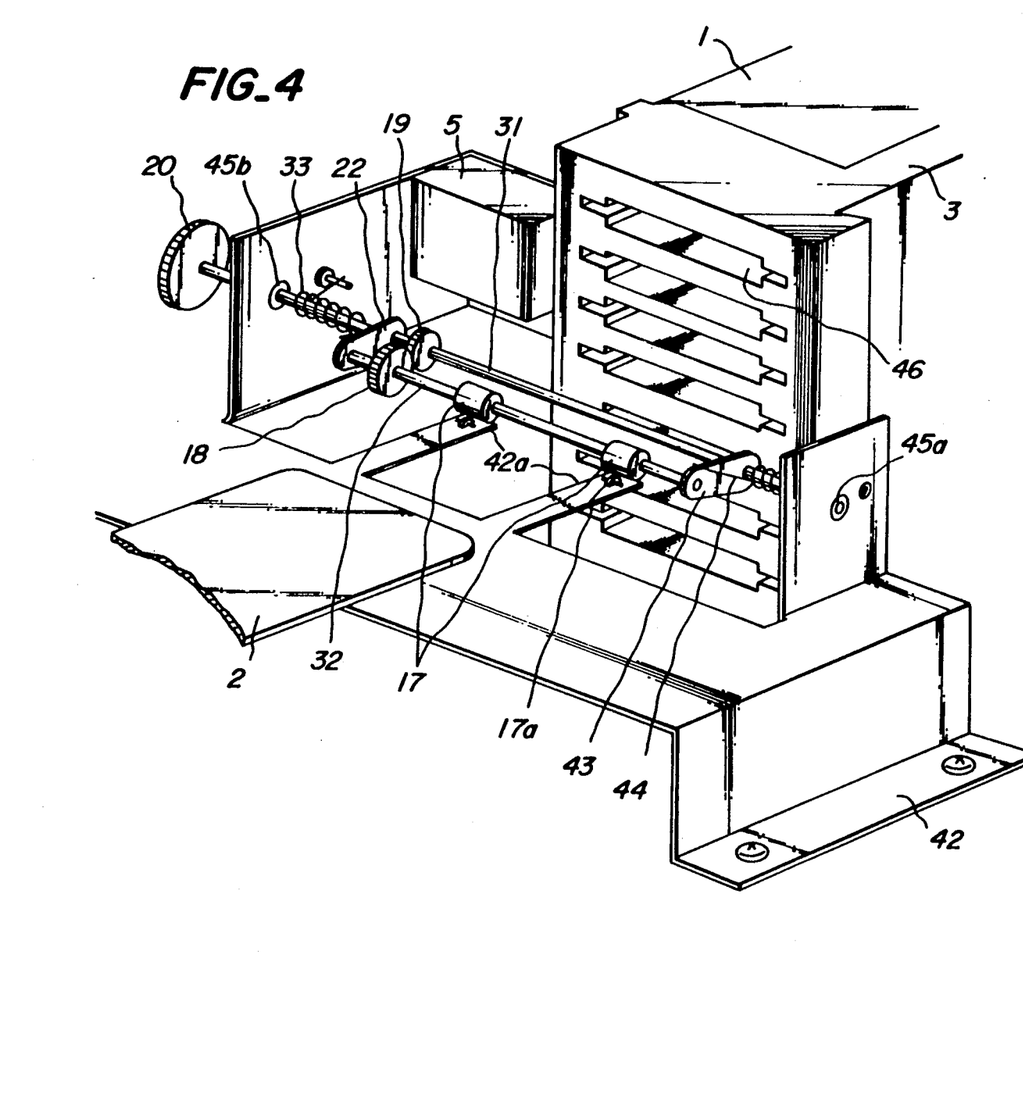
FIG. 4 is a perspective view showing the detailed construction of the second optical card driving mechanism of the apparatus.

FIGS. 3 and 4 are perspective views depicting the detailed construction of the magazine 1, table 3 and an optical card driving mechanism provided in the main body 12. In the magazine 1 there are stored a plurality of the optical cards 2 in such a manner that the optical cards are stacked one on the other, but are separated from each other. To this end, in the magazine 1 there are formed a plurality of racks. On one side wall of the magazine 1, there is secured a rack 4 extending in the direction in which the magazine is slidable with respect to the table 3. The rack 4 is engaged with a pinion gear 6 which is coupled with a stepping motor 5. The stepping motor 5 is secured to a base member 42 provided in the main body 12. By driving the stepping motor 5, it is possible to move the magazine 1 up and down so that a desired optical card 2 can be indexed at a predetermined optical card discharging position which is aligned with the slit-like opening 41 shown in FIG. 2. In this case, if a pitch of successive racks in the magazine 1 is set to an integer multiple of a distance over which the magazine is moved by supplying a single pulse to the stepping motor 5, the positioning of the magazine 1 can be effected simply by an open loop control.

On the side wall of the magazine 1 there are further formed a plurality of windows 1a each of which is provided at each respective racks formed within the magazine. There is further provided a driving roller 7 such that it can be partially inserted into the magazine through a window 1a and is made into contact with a side edge of an optical card 12. The driving roller 7 is coupled via a shaft with a gear 8 which is engaged with a gear 9, and the gear 9 is coupled via a shaft with a pulley 15. The shaft for supporting the driving roller 7 and gear 8 is rotatably secured to an arm 10 and the shaft for supporting the gear 9 and pulley 15 is rotatably secured to the base member 42. The arm 10 is rotatably secured to the base member 42 in such a manner that the arm can be rotated coaxially with the shaft for supporting the gear 9 and pulley 15. There is further provided a coiled spring not shown between the arm 10 and the base member 42 for biasing the arm to rotate in such a direction that the driving roller 7 is urged against the side edge of the optical card 12.

Figure 5A:
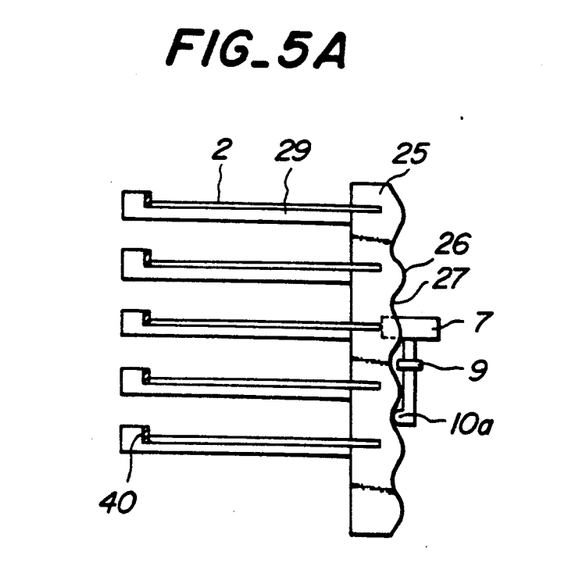
FIGS. 5A and 5B are side views of the magazine and the driving roller.
Figure 5B:
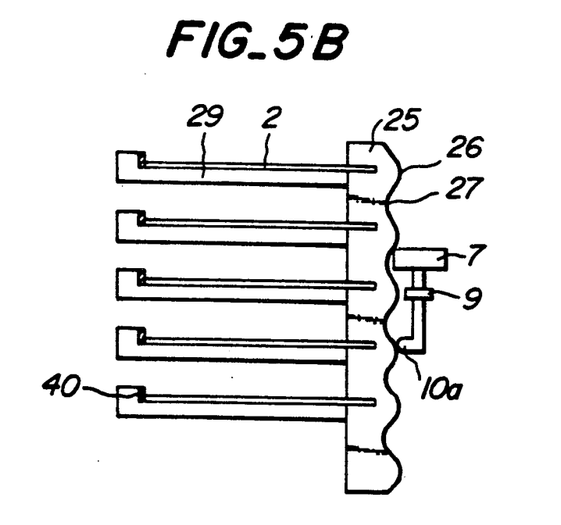

On the side wall of the magazine 1 there is further secured a corrugated member 25 having projected portions 26 and depressed portions 27. The arm 10 includes a projection 10a which is resiliently urged against the corrugated d member 25. When the projection 10a of the arm 10 is engaged with the depressed portions 27 of the corrugated member 25 as shown in FIG. 5A, the driving roller 7 is resiliently urged against the side edge of the optical card 12, so that the optical card can be moved by rotating the driving roller. It should be noted that in one sides of the racks in the magazine 1 there are formed recesses into which the driving roller 7 can be inserted. When the projection 10a of the arm 10 is engaged with the projected portions 26 of the corrugated member 25 as illustrated in FIG. 5B, the arm is rotated in the counterclockwise direction against the force of the coiled spring such that the driving roller 7 is separated from the side edge of the optical card, and therefore the magazine 1 can be moved up and down without being brought into contact with the driving roller. The driving roller 7 and other elements for driving the roller 7 constitute a first optical card driving mechanism. It should be noted that when the magazine 1 is set onto the table 3, the corrugated member 25 and rack 4 are inserted into the grooves 12b and 12c, respectively formed in the main body 12.

As shown in FIGS. 5A and 5B, the optical cards 2 are placed on the racks 29 formed in the magazine 1, and along a side edge of the optical cards 2 which are opposite to the side edges against which the driving roller 7 is engaged, there are provided slip members 40 made of material having a low coefficient of friction. In this manner, the optical card 2 can be discharged out of the rack 29 in a positive and smooth manner.

As shown in FIG. 3, the pulley 15 is engaged with a pulley 14 by means of an endless belt 16 and the pulley 14 is coupled with an output shaft of a motor 13 secured to the base member 42. Therefore, after the magazine 1 has been moved in such a position that a desired optical card 2 is indexed at the optical card discharging position by suitably driving the stepping motor 5 and the driving roller 7 has been engaged with the side edge of this optical card 2 due to the fact that the projection 10a of the arm 10 has been inserted into a depressed portion 27 of the corrugated member 25, the motor 13 is driven in a given direction to rotate the driving roller 7 in such a direction that the optical card 2 is discharged out of the magazine 1. By rotating the motor 13 in the opposite direction, the optical card 2 can be inserted into the magazine.

After the optical card 2 is discharged out of the magazine 1, it is further fed into the optical card reader and/or writer B by means of a second optical card driving mechanism. This second optical card driving mechanism will now be explained in detail. As best shown in FIG. 4, in the table 3, there are formed a plurality of optical card guides 46 each of which is aligned with respective one of racks 29 formed in the magazine 1. The optical card 2 is discharged out of the magazine 1 through one of the optical card guides 46 and is further fed between a pair of driving rollers 17 and a pair of guide rollers 17a. The guide rollers 17a are provided at front ends of resilient projections 42a formed in the base member 42. The driving rollers 17 are secured to a shaft 32 and a gear 18 is secured to the shaft 32. The gear 18 is engaged with a gear 19 which is secured to a shaft 31. At one end of the shaft 31 is secured a worm wheel 20. As shown in FIG. 3, the worm wheel 20 is engaged with a worm 21 which is coupled with the output shaft of the motor 13. In this manner, according to the invention, the first driving roller 7 as well as the second driving rollers 17 are driven by the same motor 13, so that the construction becomes simple and small.

The shaft 31 is rotatably supported by the base member 42 by means of bearings 45a and 45b, and the shaft 32 is rotatably supported by arms 22 and 43 which are also rotatably secured to the shaft 31. Around the shaft 31 are provided coiled springs 33 and 44 whose one ends are engaged with the arms 22 and 43, respectively and whose other ends are engaged with pins secured to the base member 42, so that the arms 22 and 43 are biased to rotate about the shaft 31 in such a direction that the driving rollers 17 are urged against the guide rollers 17a. It should be noted that in the present embodiment, the gear train 18, 19 is provided on one side of the optical card feeding path, but according to the invention such a driving gear train may be provided on both sides of the optical card feeding path.

Figure 6:
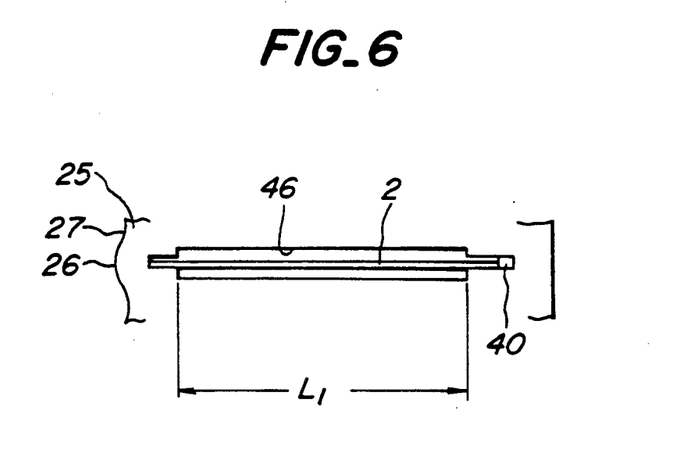
FIG. 6 is a front view of the optical card guide formed in the table.
Figure 7:
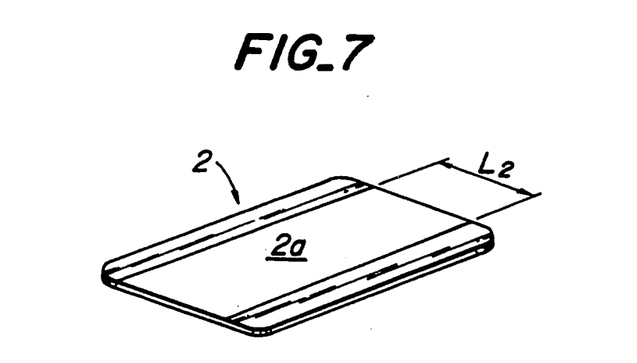
FIG. 7 is a perspective view illustrating the optical card.

FIG. 6 is a front view of the optical card guide 46. As illustrated in FIG. 6, the guide 46 includes a thick portion and a pair of thin portions provided on respective sides of the thick portion. FIG. 7 is a perspective view showing the optical card 2. The optical card 2 has an information record area 2a and side portions 2b on which no information is recorded. A width $L_1$ of the thick portion of the guide 46 is made larger than a width $L_2$ of the information record area 2a of the optical card 2. It should be noted that the driving rollers 17 are arranged such that they are engaged with the side portions 2b of the optical card 2. In this manner, according to the invention, the information record area 2a of the optical card 2 is not made into contact with the guide 29 and driving rollers 17, and therefore the information record area 2a is hardly injured.

Figure 8:
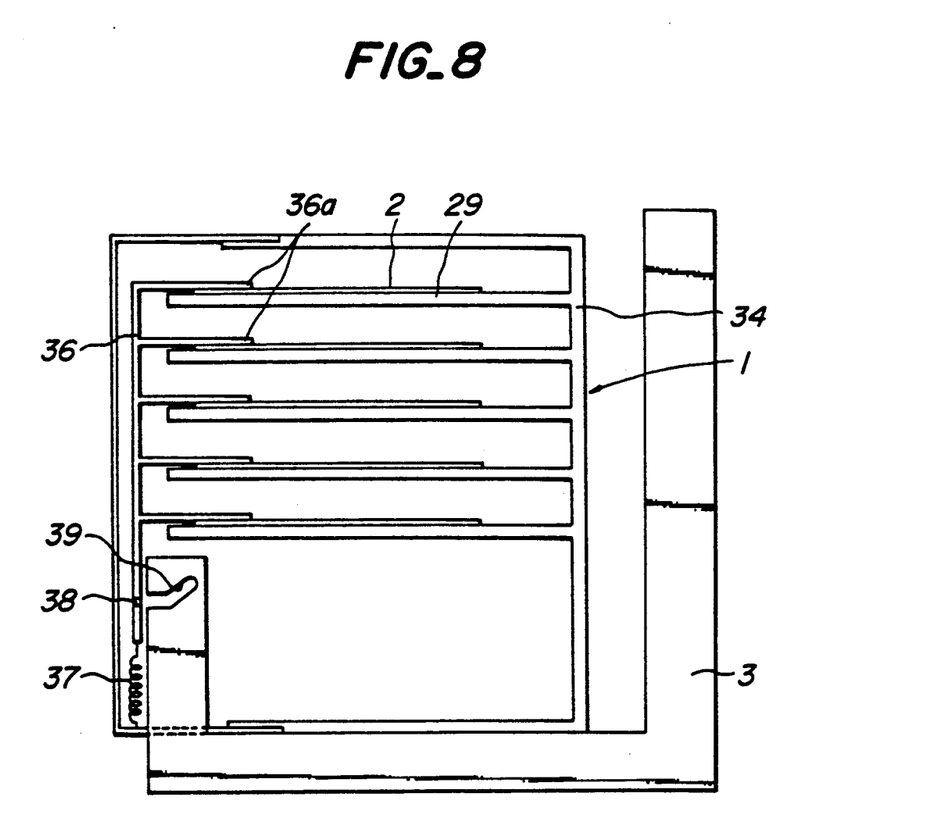
FIGS. 8, 9 and 10 are side views showing the manner of coupling the magazine with the table.
Figure 9:
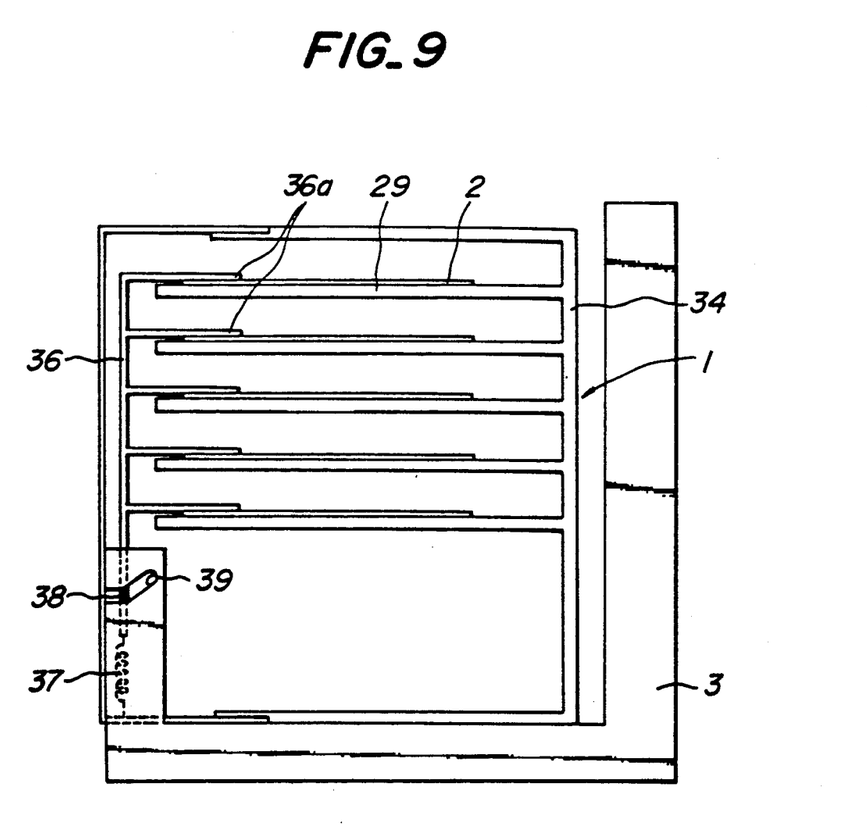
Figure 10:
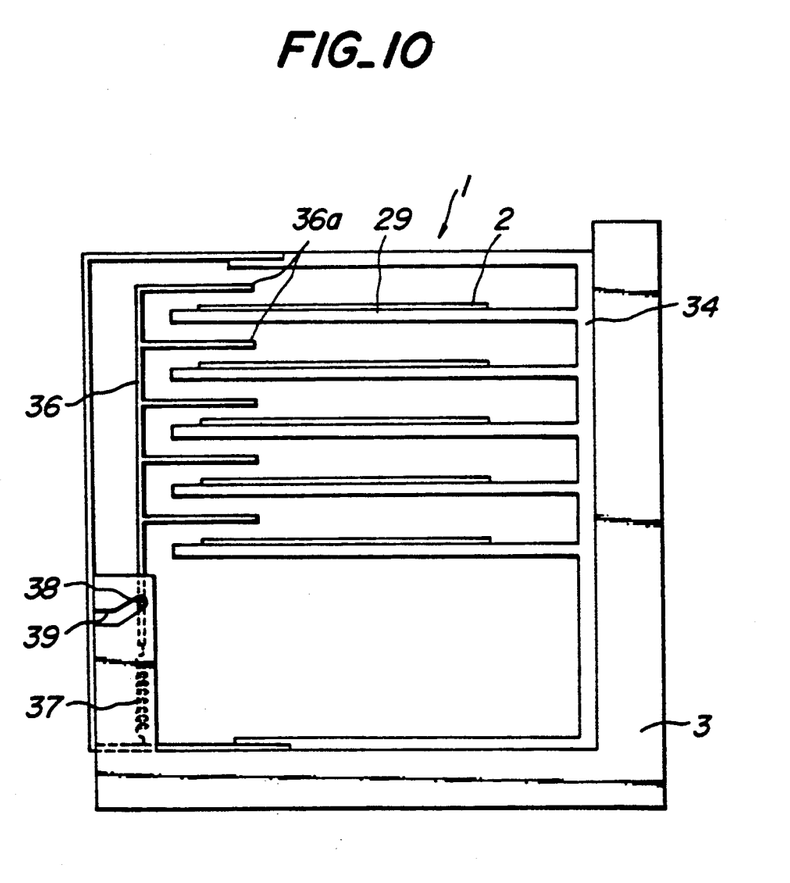

Now the construction of the magazine 1 and table 3 will be further explained in detail with reference to FIGS. 8 to 10 which are side view of the magazine and table viewed from the driving roller 7. The magazine 1 comprises a main body 34 within which a plurality of the racks 29 are formed in parallel with each other. Within the main body 34 of the magazine 1, there is arranged a card clamping member 36 having a plurality of clamping projections 36a. The card clamping member 36 is secured to the main body 34 movably up and down and is biased by a coiled spring 37 to move downward. When the magazine 1 is not fully set on the table 3, the card clamping member 36 is pulled downward by the coiled spring 37, so that the optical cards 2 are clamped between the respective racks 29 and the clamping projections 36a and could not be removed from the magazine 1. Therefore, the magazine 1 can be freely transported.

To the card clamping member 36 is secured a pin 38. When the magazine 1 is set onto the table 3, the pin 38 is inserted into a recess 39 formed in the table 3 as depicted in FIG. 9. Then the magazine 1 is further pushed in the right hand direction. Since the recess 39 has a dogleg shape, the pin 38 is moved upwards against the force of the coiled spring 37 as shown in FIG. 10. Then the projections 36a of the card clamping member 36 are also moved upwards, so that the optical cards 2 on the racks 29 can be discharged out of the magazine 1 by means of the driving roller 7.

Figure 11:
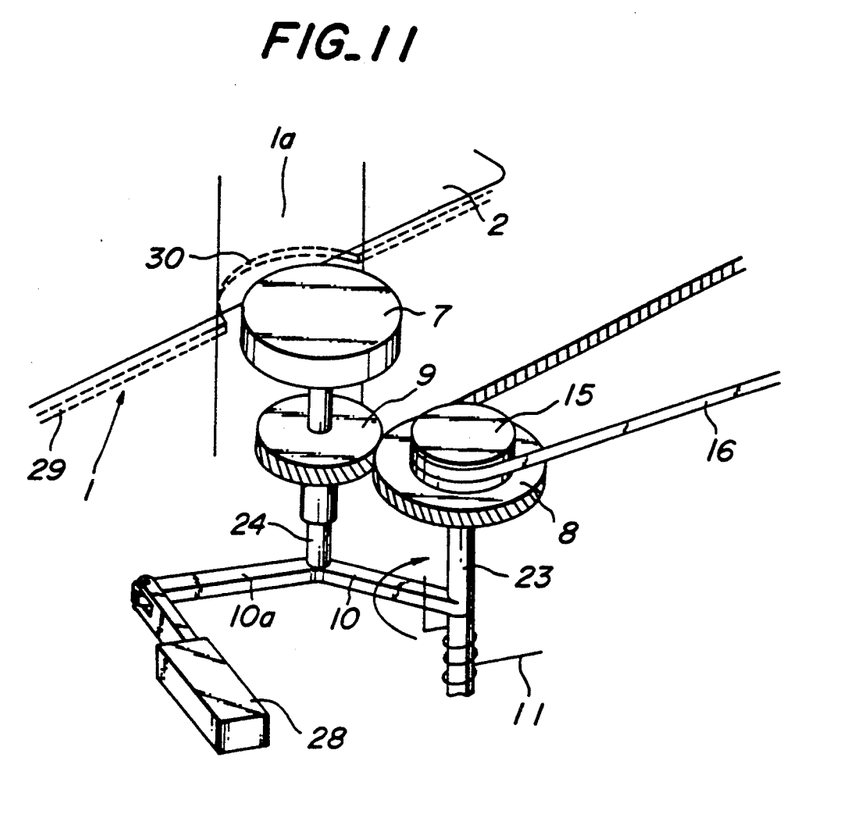
FIG. 11 is a perspective view depicting the first optical card driving mechanism of another embodiment of the apparatus according to the invention.
Figure 12:
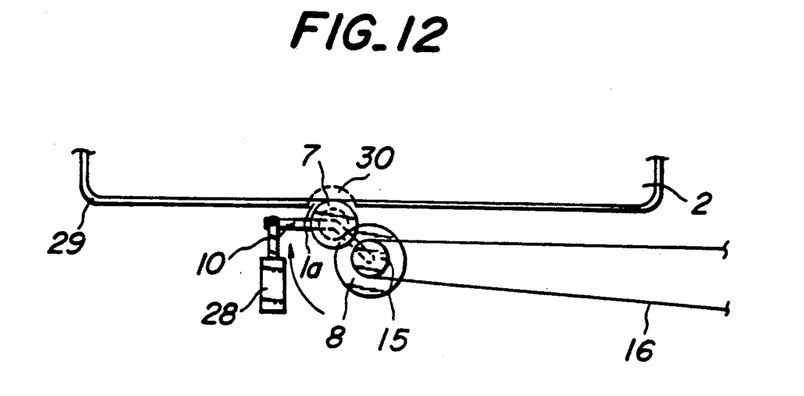
FIG. 12 is a plan view of the mechanism shown in FIG. 11.

FIGS. 11 and 12 are perspective views showing first optical card driving mechanism of another embodiment of the optical card continuously treating apparatus according to the invention. In the present embodiment, portions similar to those of the first embodiment are denoted by the same reference numerals. In the first embodiment, the driving roller 7 is selectively brought into contact with the side edge of the optical card 2 by means of the corrugated member 25. In the present embodiment, the corrugated member is replaced by a solenoid 28. That is to say, a plunger of the solenoid 28 is connected to the free end of the projection 10a of the arm 10. When the solenoid 28 is de-energized, the arm 10 is rotated by the coiled spring 11 and the driving roller 7 is brought into contact with a side edge of an optical card 2 through a window 1a. It should be noted that in the present embodiment, only one elongated window 1a is formed in the side wall of the magazine 1. When the solenoid 28 is energized, the plunger is pulled into the solenoid 28 and the driving roller 7 is moved away from the magazine 1 against the force of the coiled spring 11, so that the magazine 1 can be moved up and down. As shown in FIG. 11, in the rack 29 there is formed a semicircular recess 30 for introducing the driving roller 7 into the magazine.

The present invention is not limited by the above explained embodiments, but many modifications and alternations may be conceived by those skilled in the art within the scope of the invention. For instance, the magazine may be moved up and down by means of a DC motor instead of the stepping motor and the magazine may be stopped at the desired position by utilizing a position sensor or mechanical positioning means.

Further, the driving roller 7 may be driven not by the pulleys and endless belt, but by timing belt, chain, V-belt, and the driving rollers 17 may be driven not by the worm wheel and worm but by bevel gears.

Moreover, the optical card clamping member 36 may be moved up and down by means of a electromagnetic driving device. Further, the corrugated member 25 for selectively bringing the driving roller 7 into engagement with the side edge of the optical card may be secured not to the magazine, but to the table for detachably supporting the magazine.

As explained above, according to the present invention, a plurality of optical cards are stored in the magazine in such a manner that they are separated from each other, and during the feeding of the optical card out of and into the magazine, the information record area of the optical card is not brought into contact with any member, the optical card can be protected effectively against the injury, so that the information recorded on the optical card can be read correctly. Moreover, the first optical card driving mechanism for discharging and inserting the optical card out of and into the magazine and the second optical card driving mechanism for feeding the optical card away from and towards the magazine are driven by the one and same driving motor, so that the whole apparatus can be made simple in construction, small in size and cheap in cost. Not only the second optical card driving mechanism but also the first optical card driving mechanism are provided on the side of the table, and thus the height of the apparatus can be shortened. In the above embodiment, there is provided the optical card clamping member for selectively clamping the optical cards in the magazine, the magazine can be transported freely while the optical cards can be effectively remained within the magazine.

What is claimed is:

1. An apparatus for continuously processing a plurality of optical cards in succession, comprising:

a magazine for storing a plurality of optical cards such that the optical cards are separated from each other, said magazine comprising a main body, a plurality of racks arranged within said main body for supporting the optical cards horizontally, and at least one window formed in said main body so that side edges of the optical cards are exposed through said window out of the main body;

a table for supporting said magazine movably up and down;

a magazine driving means provided outside said magazine for moving the magazine up and down such that a desired optical card stored in the magazine is indexed at a predetermined optical card discharging and inserting position;

a first optical card driving means provided outside said magazine for discharging and inserting an optical card positioned at said predetermined optical card discharging and inserting position out of and into the magazine, said first optical card driving means comprising a driving roller which is selectively and resiliently brought into contact with a side edge of the optical card indexed at the predetermined optical card discharging and inserting position and driving means for rotating said driving roller in either of two rotational directions, said driving means comprising a first shaft to which said driving roller is secured, a first gear secured rigidly to said first shaft so as to be rotatable therewith, a second gear engaged with said first gear, a second shaft to which said second gear is secured, a first pulley secured to said second shaft, an endless belt engaged with said first pulley, a second pulley engaged with said endless belt, a motor having an output shaft to which said second pulley is secured, an arm for rotatably supporting said first and second shafts, said arm being rotatably secured to a stationary member so that it has a common axis of rotation with said second shaft, a spring member for biasing said arm such that the driving roller is resiliently urged against the side edge of the optical card, and a rotating means for rotating said arm against said spring member so that the driving roller is moved away from the side edge of the optical card; and a second optical card driving means provided outside said magazine for feeding the optical card discharged from the magazine by said first optical card driving means into an optical card utilizing device and feeding the optical card from said optical card utilizing device toward said magazine.

2. An apparatus according to claim 1, wherein said magazine further comprises slip members having a low coefficient of friction, each of which is provided along one side of a respective rack such that a side edge of the optical card which is opposite to the side edge with which the driving roller is brought into contact is urged against said slip member.

3. An apparatus according to claim 1, wherein said magazine and table are detachably coupled with each other by means of dovetail groove and dovetail projection which extend in said first direction.

4. An apparatus according to claim 1, wherein said magazine driving means comprises a rack provided on a side wall of the magazine, a pinion gear engaged with said rack, and a motor for rotating said pinion gear in both directions.

5. An apparatus according to claim 4, wherein said motor is a stepping motor and a pitch of the rack provided in the magazine is set to an integer multiple of a distance over which the magazine is moved when a single pulse is supplied to the stepping motor.

6. An apparatus according to claim 1, wherein said rotating means comprises a corrugated member secured on the side wall of the magazine and a projection secured to said arm, said projection being brought into contact with said corrugated member such that when the projection is brought into contact with a depressed portion of the corrugated member, the driving roller is urged against the side edge of the optical card and when the projection is brought into contact with a raised portion of the corrugated member, the driving roller is removed from the magazine.

7. An apparatus according to claim 1, wherein said rotating means comprises a projection secured to said arm and a solenoid having a plunger connected to a free end of said projection such that when the solenoid is energized, the driving roller is moved away from the magazine and when the solenoid is de-energized, the driving roller is resiliently brought into contact with the side edge of the optical card.

8. An apparatus according to claim 1, wherein said second optical card driving means comprises a pair of driving rollers arranged to be brought into contact with one surface of the optical card, and a driving means for rotating said pair of driving rollers in either of two rotational directions.

9. An apparatus according to claim 8, wherein said first optical card driving means and said second optical card driving means comprise one and the same motor.

10. An apparatus according to claim 8, wherein said pair of driving rollers are separated from each other so that they are brought into contact with side portions of the optical card which are arranged on both sides of an information record area and on which no information is recorded.

11. An apparatus according to claim 10, wherein said table comprises a plurality of guides each of which is aligned with one of said plurality of racks formed in the magazine.

12. An apparatus according to claim 11, wherein each of said guides of the table includes a thick portion whose width is larger than a width of the information record area on the optical card and a pair of thin portions arranged on respective sides of the thick portion, said side portions of the optical card being placed on said thin portions, respectively.

13. An apparatus for continuously processing a plurality of optical cards in succession, the apparatus comprising:
    a magazine for storing the plurality of optical cards such that the plurality of optical cards are separated from one another, the magazine having formed therein a plurality of optical card holding enclosures which are arranged along a first direction perpendicular to surfaces of the plurality of optical cards, each of the plurality of optical card holding enclosures having a first opening through which an optical card is insertable into and removable from the optical card holding enclosure in a second direction in which the optical card extends, a second opening through which a first longitudinal side edge of the optical card is accessible from outside the magazine, and a side wall against which a second longitudinal side edge of the optical card is urged;
    magazine driving means for moving the magazine in the first direction with respect to a main body of an optical card reading apparatus;
    an optical card feeding means having a feeding roller which is insertable into said optical card holding enclosures through the second opening in a third direction perpendicular to the first and second directions to be brought into contact with the first longitudinal side edge of the optical card to feed the optical card from the optical card holding enclosure to the main body of the optical card reading device; and
    an optical card transferring means for transferring the optical card between the first opening of the optical card holding enclosure to the main body of the optical card reading device.

14. An apparatus according claim 13, wherein each of the plurality of optical card holding enclosures includes an optical card supporting surface extending in parallel with the second and third directions, the optical card being placed on the optical card supporting surface with its record surface facing upward, and wherein the optical card supporting surface has formed therein a semicircular recess into which the feeding roller of the optical card feeding means is inserted.

15. An apparatus according to claim 13, wherein the feeding roller of the optical card feeding means and the optical card transferring means are coupled with a common driving motor.

16. An apparatus according to claim 13, wherein said magazine lacks openings other than said first openings and said second openings, whereby dust and other contaminants are kept out of the magazine.

17. An apparatus according to claim 13, wherein said feeding roller is insertable into one of said plurality of optical card holding enclosures selected by a motion of said magazine driving means.

18. An apparatus for continuously processing a plurality of optical cards in succession, the apparatus comprising:
    a magazine for storing a plurality of optical cards such that the optical cards are separated from each other;
    a table for supporting said magazine movably in a first direction in which said optical cards are stacked;
    a magazine driving means provided outside said magazine for moving the magazine in said first direction such that a desired optical card stored in the magazine is indexed at a predetermined optical card discharging and inserting position;
    an optical card driving motor;
    a first optical card driving means provided outside said magazine for discharging and inserting an optical card positioned at said predetermined optical card discharging and inserting position out of and into the magazine, the first optical card driving means being powered by the optical card driving motor; and
    a second optical card driving means provided outside said magazine for feeding the optical card discharged from the magazine by said first optical card driving means into an optical card utilizing device and feeding the optical card from said optical card utilizing device toward said magazine, the second optical card driving means comprising a pair of driving rollers powered by said optical card driving motor to be rotatable in either of two rotational directions and arranged to be brought into contact with a first surface of the optical card, a pair of guide rollers arranged to be brought into contact with a second surface of the optical card that is opposite to the first surface of the optical card, a first shaft to which said pair of driving rollers are secured, a first gear secured to said first shaft, a second shaft arranged in parallel with said first shaft, a second gear secured to said second shaft and engaged with said first gear, a pair of arms to which said first and second shafts are rotatably secured, a third gear secured to said second shaft, a transmission mechanism for coupling said third gear to said optical card driving motor, and a pair of coiled springs arranged on said second shaft such that said pair of arms are biased to rotate in such a direction that said pair of driving rollers are resiliently urged against said pair of guide rollers.

* * * * *